(12) United States Patent
Van Zon et al.

(10) Patent No.: US 6,718,622 B1
(45) Date of Patent: Apr. 13, 2004

(54) METHOD OF FORMING AN ASSEMBLY OF STACKED LAYERS

(75) Inventors: Joannes B. A. D. Van Zon, Eindhoven (NL); Gerardus S. A. M. Theunissen, Roermond (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/452,580

(22) Filed: Dec. 1, 1999

(30) Foreign Application Priority Data

Dec. 3, 1998 (EP) .............................................. 98204104

(51) Int. Cl.⁷ .............................................. G11B 5/127
(52) U.S. Cl. .............................. 29/603.12; 29/603.13; 29/603.14; 29/603.15; 360/123; 360/125; 427/131
(58) Field of Search ......................... 29/603.13, 603.14, 29/603.15, 603.12, 603.1, 603.11; 360/120, 126, 321, 125, 123; 451/5, 6, 285; 427/129, 131

(56) References Cited

U.S. PATENT DOCUMENTS

| 5,064,683 A | * | 11/1991 | Poon et al. .................... 427/39 |
| 5,272,117 A | * | 12/1993 | Roth et al. ................... 437/228 |
| 5,566,442 A | * | 10/1996 | Gaud et al. ............... 29/603.14 |
| 5,597,341 A | | 1/1997 | Kodera et al. .................. 451/5 |
| 5,604,973 A | * | 2/1997 | Gaud et al. ............... 29/603.15 |
| 5,890,278 A | * | 4/1999 | Van Kesteren ........... 29/603.14 |
| 6,167,611 B1 | * | 1/2001 | Gaud et al. ............... 29/603.14 |

FOREIGN PATENT DOCUMENTS

| EP | 0617409 A2 | 9/1994 |
| JP | 06267776 | 9/1994 |

* cited by examiner

*Primary Examiner*—Carl J. Arbes
*Assistant Examiner*—Minh Trinh

(57) ABSTRACT

In an assembly of layers, a first layer has a recess, a second layer is deposited over the first layer, and a third layer is deposited over the second layer and fills the recess. The material of the third layer is less wear resistant than the second layer. After forming the second layer, the assembly is polished to create a flat and smooth surface. The polishing is stopped upon reaching the second layer.

13 Claims, 4 Drawing Sheets

METHOD OF FORMING AN ASSEMBLY OF STACKED LAYERS

FIELD OF THE INVENTION

The invention relates to the field of multi-layer deposited then film structures.

BACKGROUND OF THE INVENTION

The invention relates to a method of forming an assembly of stacked layers, in which method use is made of a recessed first layer on which a second layer filling up the recess is formed by depositing a material, and a polishing treatment is performed for forming a plane surface.

Such a method is known from EP-A 0 617 409 (PHN 14.428). In the known method, which is used in the manufacture of thin-film magnetic heads, a first layer is formed by depositing zirconium or quartz on a support, whereafter a recess is provided in this layer by removing material. Subsequently, a second layer filling up the recess is formed by depositing a soft-magnetic material. After the formation of the second layer, a mechanochemical polishing treatment is carried out until the first layer is reached, resulting in a plane surface formed by the first layer and the remaining part of the second layer present in the recess.

The above citation is hereby incorporated herein in whole by reference:

SUMMARY OF THE INVENTION

It has been found that in the known method, when the second layer is more wear-resistant than the first layer, it is difficult to control the polishing process in such a way that a smooth and plane surface is or has been obtained after reaching the first layer.

It is an object of the invention to improve the method described in the opening paragraph in such a way that a plane surface can be obtained in a simple manner during the polishing treatment.

According to the invention prior to forming the second layer, an intermediate layer restraining the polishing treatment is formed on the first layer by depositing a material which is more wear-resistant than the material of the second layer, and in that the polishing treatment is terminated after the intermediate layer has been reached.

When the polishing treatment, for example, a mechanochemical polishing treatment is being carried out, only the second layer, at least opposite and proximate to the recess, is polished initially. Since this layer has a homogeneous composition, the polishing treatment proceeds regularly in this phase and a smooth and plane polishing surface is obtained. The polishing rate changes at the instant when the plane in which the polishing treatment takes place reaches the intermediate layer. In fact, due to the larger wear resistance of the intermediate layer, the resistance against polishing increases. This means that a plane and smooth surface is ensured if the polishing treatment is terminated at that instant.

The method according to the invention is particularly important if the second layer has a larger wear resistance than the first layer. This is the case, for example, if the first layer is or has been formed from $SiO_2$, $Al_2O_3$ or Si and the second layer is or has been formed from an FeNbSi, CoZrNb or FeSiAl alloy.

If the first and the second layer have the same wear resistance, it is favorable to use the intermediate layer as an indicator for terminating the polishing treatment. Also if the layers have mutually different wear resistances, it is favorable to use the intermediate layer as a visual indicator for terminating the polishing treatment. When using an indicator, the polishing treatment does not need to be temporarily interrupted for repeatedly measuring the quantity of material which is still to be polished off before a desired thickness of the second layer is reached and polishing should be terminated.

In an embodiment of the method according to the invention, at least substantially chromium and/or a chromium compound is used as a material of the intermediate layer. Although various materials may be used, it has been found that chromium and chromium compounds are particularly suitable as materials for forming the intermediate layer. Chromium and chromium compounds may be sputtered, which has the advantage that the composition and hence the wear resistance of the intermediate layer can be adjusted by adding nitrogen and/or oxygen during sputtering. If it is desirable to remove, prior to the formation of the second layer, parts of the intermediate layer in the recess or remainders of the intermediate layer outside the recess after polishing, this may be done by selectively non-chemical etching when chromium and chromium compounds are used. A further advantage of chromium and chromium compounds is that very thin layers, of the order of 20 to 50 nm, are sufficient to obtain a desired wear resistance.

The intermediate layer provided on the first layer may successfully serve as a protective layer during manufacture so as to prevent scratches which might be caused, for example, during polishing, and similar damages in the first layer. This is particularly important if the first layer has an insulating function such as, for example, in semiconductor structures. A damaged first layer may then easily give rise to short circuit in a conductor pattern provided on or in this layer.

In another embodiment of the method according to the invention, a chromium nitride and/or a chromium oxide and/or a chromium oxynitride is used as a chromium compound. A specific advantage of such compounds is that the quantity of nitride and/or oxide which is present determines the extent of wear resistance of the intermediate layer. In other words, the wear resistance is dependent on the quantity of oxide and/or nitride. By varying the quantity of oxide and/or nitride, a desired wear resistance, particularly determined by the material of the second layer, can thus easily be adjusted.

In another embodiment of the method according to the invention a non-magnetic, non-electrically conductive layer is used as the first layer. A further embodiment a magnetic and/or electrically conducting material is used as a material for the second layer. In another embodiment, a material corresponding to the material from which the first layer is formed is used as a material for the second layer. In all cases, the first layer may be or have been provided on a substrate or support. The first layer itself may also function as a support.

The invention also relates to an assembly manufactured by means of the method according to the invention.

The invention also relates to a magnetic head. Depending on the transducing element used, such a magnetic head may be an inductive or a magnetoresistive magnetic head and may be used in a device for magnetically writing and/or reading information. Such a device is, for example, a magnetic tape apparatus or a hard disk drive.

The invention also relates to a magnetic head unit in which a transducing element embedded in the second layer extends in the recess. Such a magnetic head unit may be used, for example, for writing information into and/or reading information from a magnetic optical storage medium.

It should be noted with respect to the claims that various combinations of characteristic features defined in the dependent claims are possible.

These and other aspects of the invention are apparent from and will be elucidated with reference to the embodiments described hereinafter.

DETAILED DESCRIPTION OF THE PREFERRED EMBODIMENT

Figure 1:
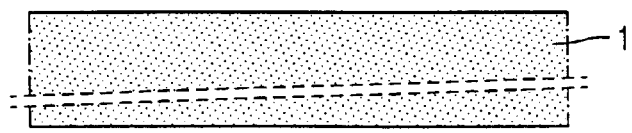
FIGS. 1 to 7 show diagrammatically various stages of a first embodiment of the method according to the invention.
Figure 2:
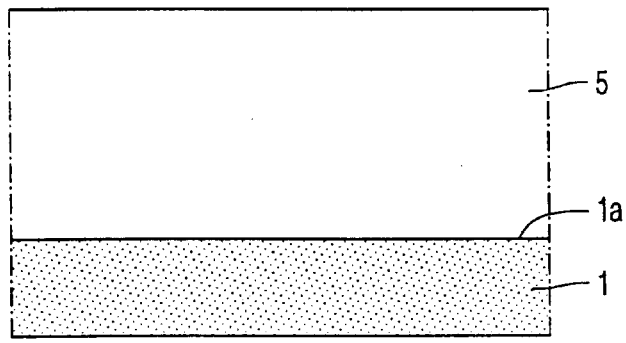
Figure 3:
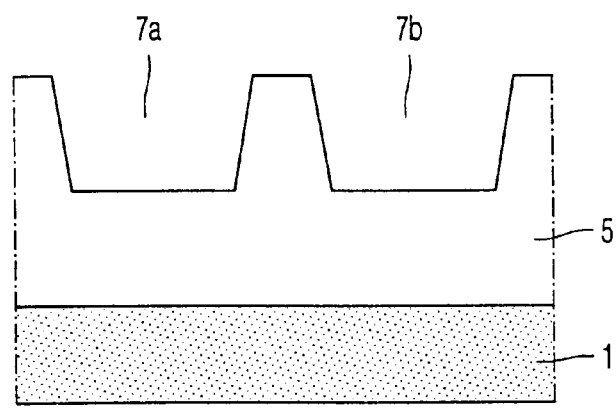
Figure 4:
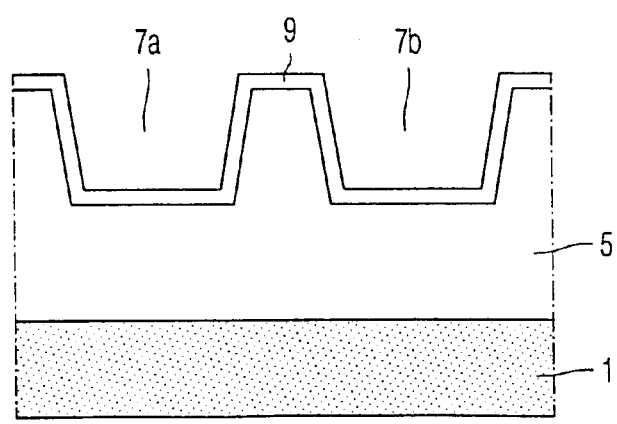
Figure 5:
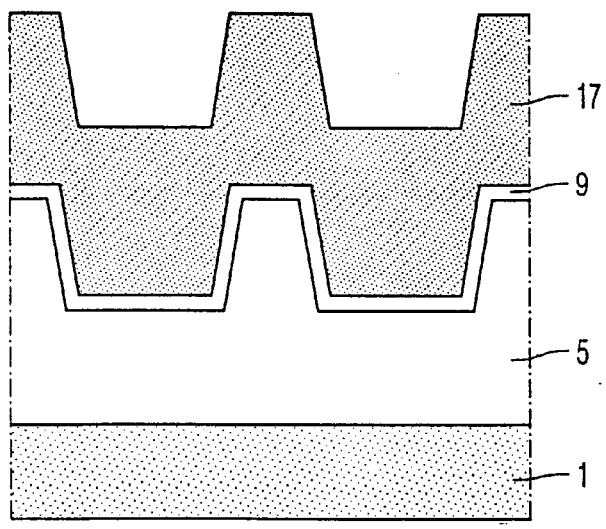
Figure 6:
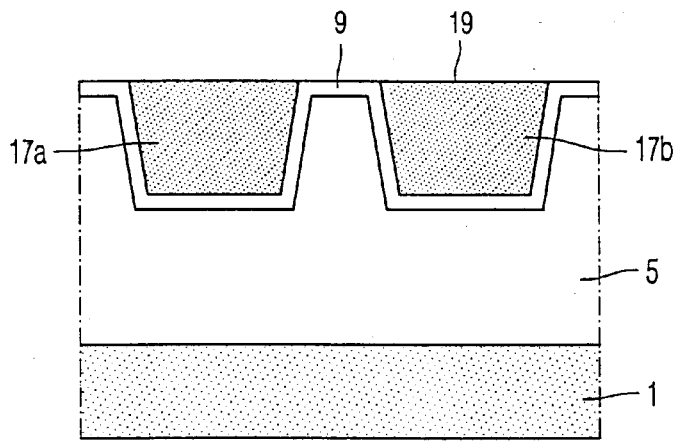
Figure 7:
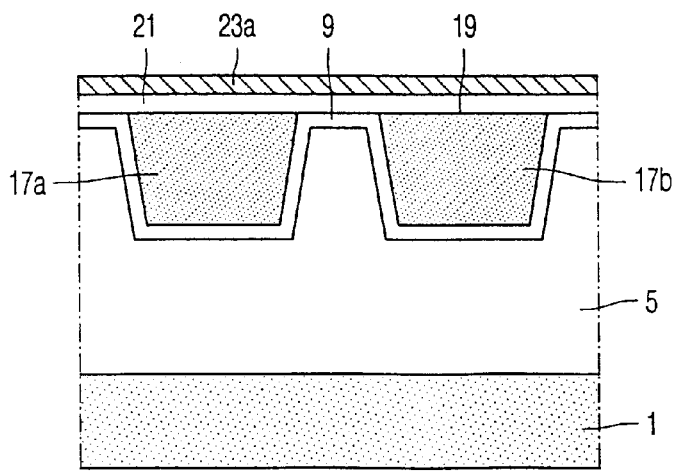

A first embodiment of the method according to the invention will now be described with reference to FIGS. 1 to 8. This embodiment starts from a plate-shaped support 1 of ferrite, in this example an NiZn ferrite. A first layer 5 of an insulating material, in this example quartz, is formed on a surface 1a of the support 1 by means of, for example, sputtering deposition. Two recesses 7a and 7b are formed in the first layer 5, for example, by chemically etching or reactive ion etching while using a mask. A layer, further referred to as intermediate layer 9, is formed on the first layer 5 thus structured by means of deposition, for example, sputtering deposition of a wear-resistant material, in this example a chromium oxide. Subsequently, a second layer 17 of a soft-magnetic material is formed, while the recesses 7a and 7b are filled up completely for forming two flux guides 17a and 17b. In this example, the layer 17 is formed by sputtering deposition of a CoZrNb alloy. Instead of a CoZrNb alloy, it is alternatively possible to use a different suitable alloy such as an FeNbSi alloy or an FeSiAl alloy. After formation of the second layer 17, a polishing treatment, for example, a mechanocheimical polishing treatment is performed. Initially, the polishing treatment is carried out exclusively on the second layer 17 so that a plane polishing surface is obtained. However, at a given instant, the intermediate layer 9 is reached. From that instant, the intermediate layer 9 has a polishing-restraining effect on the performed polishing process due to the applied choice of material. The increased polishing resistance which then occurs is an indication that the intermediate layer 9 has actually been reached and that the polishing process can be terminated. After termination, a substantially completely smooth and plane surface 19 is obtained, a part of which is formed by the material of the intermediate layer 9 and another part of which is formed by the soft-magnetic material of flux guides 17a and 17b.

If a mechanochemical polishing treatment is used, for example, a colloidal suspension of $SiO_2$ particles in an alkali solution may be used.

A thin insulation layer 21 of a non-magnetic, insulating material is provided on the plane surface 19 obtained in the manner as described hereinbefore. In this example, quartz is deposited for that purpose. A layer 23a of a magnetoresistive material is provided on the layer 21, for which purpose an alloy of NiFe is sputtered in this example. The layer 23a is subsequently structured by means of known lithographic techniques so as to form an MR element 23. An electrically conducting material, for example Au, may be deposited on the MR element 23 so as to form equipotential strips 25a. Subsequently, an insulation layer 27 of, for example, quartz is provided, whereafter a protective counter block 31 of, for example $BaTiO_3$ or $CaTiO_3$ is secured, for example, by means of an adhesive. The intermediate product now obtained is provided with a head face 33 for co-operation with a magnetic recording medium, particularly a magnetic tape, by means of treatments such as, for example, grinding and/or lapping.

Figure 8:
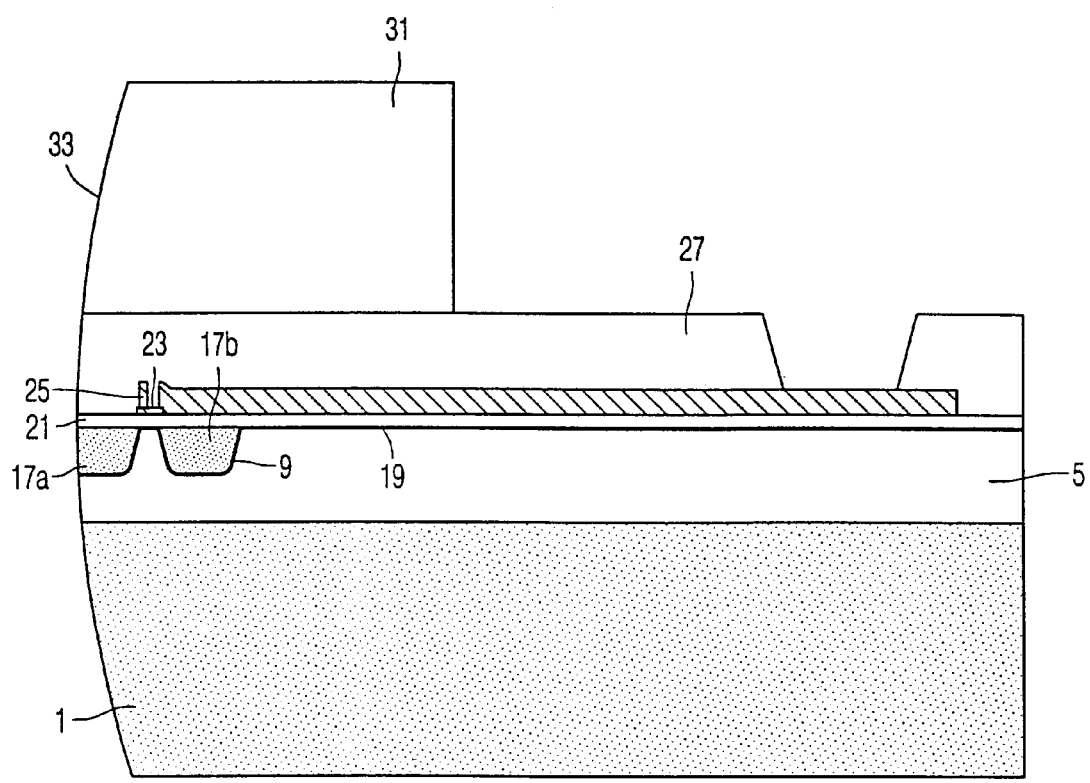
FIG. 8 shows diagrammatically a thin-film magnetic head according to the invention, manufactured by means of the first embodiment of the method according to the invention.
Figure 9:
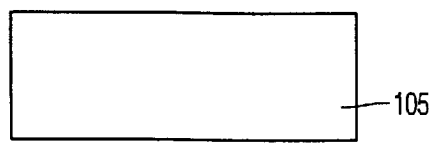
FIGS. 9 to 13 show diagrammatically various stages of a second embodiment of the method according to the invention.
Figure 10:
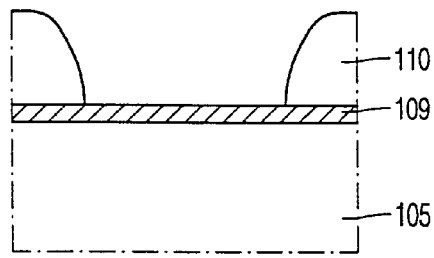
Figure 11:
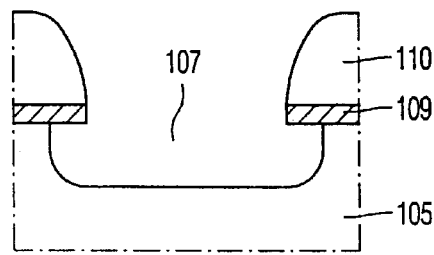

If the soft-magnetic material of the flux guides 17a and 17b in the thin-film magnetic head according to the invention, shown in FIG. 8, is replaced by a soft-magnetic material which is electrically non-conducting or electrically poorly conducting, particularly an MnZn ferrite, an NiZn ferrite or $Fe_2O_3$ ferrite, the MR element 23 may be directly provided on the plane surface 19. Consequently, the insulation layer 21 may be dispensed with and the MR element 23 may be in direct magnetic contact with the flux guides 17a and 17b.

Figure 12:
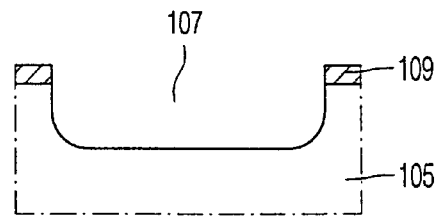
Figure 13:
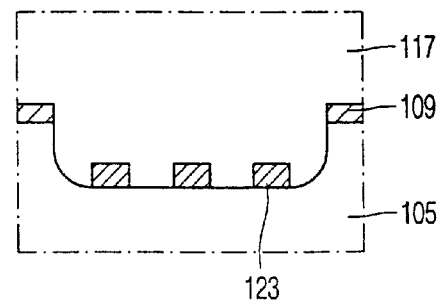
Figure 14:
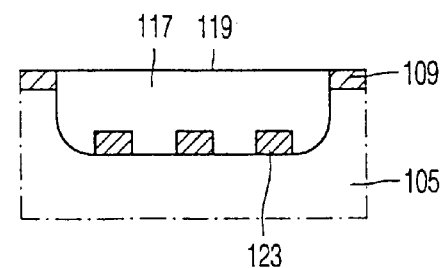
FIG. 14 shows diagrammatically a magnetic head unit according to the invention, manufactured by means of the second embodiment of the method according to the invention.

A second embodiment of the method according to the invention will now be described with reference to FIGS. 9 to 14. This method for forming an assembly of stacked layers starts from a first layer 105 in the form of a plate-shaped substrate of, for example an oxidic material such as quartz. A layer, further referred to as intermediate layer 109, is formed on this layer by depositing a wear-resistant material such as a chromium oxide. Subsequently, a photoresist layer 110 of, for example a customary photoresist is formed, which serves as a mask for an etching treatment in which a part of the photoresist layer 110 is first removed and subsequently a recess 107 is formed in the first layer 105. After removal of the photoresist layer 110 and parts of the intermediate layer 109 possibly overhanging the recess 107, the combination of layers diagrammatically shown in FIG. 12 is obtained, with the first layer 105 being provided with the recess 107 and, outside the recess 107, coated with the intermediate layer 109. An element 123, in this example an inductive transducing element in the form of a coil, is provided in the recess 107, whereafter a second layer 117 is formed by means of deposition of, for example, an oxidic material such as quartz. With regard to the materials used, this is chosen to be such that the material of the intermediate layer 109 is more wear-resistant than the material of the second layer 117. After formation of the second layer 117, a polishing treatment is performed so as to form a smooth and plane surface 119. When the intermediate layer 109 is reached during polishing, its wear resistance has a restraining effect on the polishing treatment so that the intermediate layer 109 can be considered as a polish-stopper layer. The use of such a layer has the advantages that a predefined level is indicated for terminating the polishing treatment and that the polishing treatment results in a plane and smooth surface. After termination of the polishing treatment, the intermediate layer 109 is completely removed in this example. This may be done, for example by means of sputter etching. The magnetic head unit according to the invention thus obtained may be used for writing video and/or audio and/or data information in a magnetic optical recording medium, for example a disc.

It is to be noted that the invention is not limited to the embodiments shown. For example, the method according to the invention may be alternatively used in methods of manufacturing semiconductor elements.

What is claimed is:

1. A method comprising the steps of:

forming a first layer with a recess having a depth;

forming an intermediate layer by deposition over the first layer;

forming a second layer by depositing a material on a surface of the intermediate layer and in the recess such that the recess is filled with the material; and polishing an exposed surface of the second layer to form a plane surface, the plane surface being formed by a portion of the intermediate layer and a remaining portion of the second layer present in the recess, wherein the surface of the intermediate layer has a relatively greater polish resistance than has the exposed surface of the second layer, and wherein the relatively greater polish resistance of the surface of the intermediate layer is used as an indicator for terminating the polishing.

2. The method of claim 1, wherein the intermediate layer comprises second material selected from the group consisting of chromium and a chromium compound.

3. The method of claim 2, wherein chromium compound is selected from the group consisting of a chromium nitride, a chromium oxide, and a chromium oxynitride.

4. The method of claim 1, in which a non-magnetic, non-electrically conducting layer is used as the first layer.

5. The method of claim 4, wherein the material of the second layer is selected from the group consisting of a magnetic material, an electrically conducting material, and a combination thereof.

6. The method of claim 1, wherein the first layer comprises the material.

7. The method of claim 1 in which a thickness of the intermediate layer is less than a depth of the recess.

8. The method of claim 1 in which a thickness of the second layer is at least equal to a depth of the recess.

9. The method of claim 1:

wherein a thickness of the intermediate layer is less than the depth of the recess;

wherein a thickness of the second layer is at least equal to the depth of the recess;

wherein the intermediate layer comprises a second material selected from the group consisting of chromium, a chromium nitride, a chromium oxide, and a chromium oxynitride;

wherein a non-magnetic, non-electrically conducting layer is used as the first layer; and wherein the material of the second layer is selected from the group consisting of a magnetic material, an electrically conducting material, and a combination thereof.

10. The method of claim 1, wherein the second layer comprises magnetic material.

11. The method of claim 1, wherein the polishing is not temporarily interrupted.

12. The method of claim 1, further comprising prior to forming the second layer, removing a portion of the intermediate layer.

13. The method of claim 1, further comprising prior to forming the second layer, providing an inductive transducing element in the recess.

* * * * *